United States Patent [19]
Kakuta

[11] 3,717,847
[45] Feb. 20, 1973

[54] METHOD AND APPARATUS FOR TRACING THE CONTOUR OF A PATTERN

[75] Inventor: Kazuhiko Kakuta, Tokyo, Japan

[73] Assignee: Iwatsu Electric Company Ltd., Tokyo, Japan

[22] Filed: May 28, 1970

[21] Appl. No.: 41,471

[30] Foreign Application Priority Data

May 31, 1969 Japan ................................44/42080

[52] U.S. Cl. ..........................340/146.3 AE, 250/202
[51] Int. Cl. ................................................G06k 9/16
[58] Field of Search........250/202, 219 QA; 318/577; 340/146.3 AE; 178/6.8

[56] References Cited

UNITED STATES PATENTS 3,297,988 1/1967 Greanias et al. ..........340/146.3 AE
3,429,989 2/1969 Stockdale.........................250/202 X
3,446,969 5/1969 Lange..................................250/202
3,502,882 3/1970 Von Voros..........................250/202

OTHER PUBLICATIONS

Kuhl, 1963 IEEE International Convention Record, "-Classification and Recognition of Hand-Printed Characters," Part 4, pp. 75–93.

*Primary Examiner*—Thomas A. Robinson
*Assistant Examiner*—Leo H. Boudreau
*Attorney*—Chittick, Pfund, Birch, Samuels & Gauthier

[57] ABSTRACT

The tone of a point on a drawing is read out by a detector and the output of the detector is used to perform a judgment regarding the tracing of the pattern contour. The detector is moved to a predetermined point on a drawing in accordance with the result of judgment which is made by referring to the direction of previous tracing operation.

1 Claim, 5 Drawing Figures

KAZUHIKO KAKUTA INVENTOR

BY Chittick, Pfund, Birch, Samuels & Gauthier
ATTORNEY

KAZUHIKO KAKUTA INVENTOR

BY Chittick, Pfund, Birch, Samuels & Gauthier

ATTORNEY

KAZUHIKO KAKUTA INVENTOR

BY Chittick, Pfund, Birch, Samuels & Gauthier

ATTORNEY

METHOD AND APPARATUS FOR TRACING THE CONTOUR OF A PATTERN

CROSS REFERENCE TO RELATED APPLICATIONS

This application is related to applications filed of even date herewith, Ser. Nos. 41,297, 41,296, 41,291 and 41,172, all assigned to the assignee of the present invention.

BACKGROUND OF THE INVENTION

This invention relates to a method and apparatus for automatically tracing the contour of a pattern on a sheet of drawing.

Where it is desired to convert a pattern of a relatively wide area such as a photograph or a hand written pattern into electric signals it is usual to scan the entire surface of the sheet by means of an image pick-up tube and the like. With such a system however, areas of the sheet not directly related to the pattern are also scanned so that it takes a long time to scan, thus decreasing the operating efficiency of the system.

SUMMARY OF THE INVENTION

It is, therefore, an object of this invention to provide a novel method of automatically tracing the contour of a pattern depicted on a sheet of drawing to convert the contour into electric signals.

Another object of this invention is to provide an improved method and apparatus capable of tracing the contour of a pattern at a high accuracy.

According to this invention the variation in the tone of any spot or point of a drawing is detected or sampled by a detector and converted into an electric signal. Means responsive to the output signal from the detector is provided to provide a signal to judge whether the pattern contour is to be traced or not and to move the detector for performing the tracing operation. Thus the detector is moved to a predetermined spot on the drawing in accordance with said signal. The tracing direction at each tracing operation is stored in a memory and the judgment as to whether the pattern contour is to be traced or not is made according to the direction of previous tracing. In this manner the contour of the pattern can be automatically traced correctly and precisely.

BRIEF DESCRIPTION OF THE DRAWINGS

The invention can be more fully understood from the following detailed description taken in conjunction with the accompanying drawing in which.

DESCRIPTION OF THE PREFERRED EMBODIMENT

Figure 1:
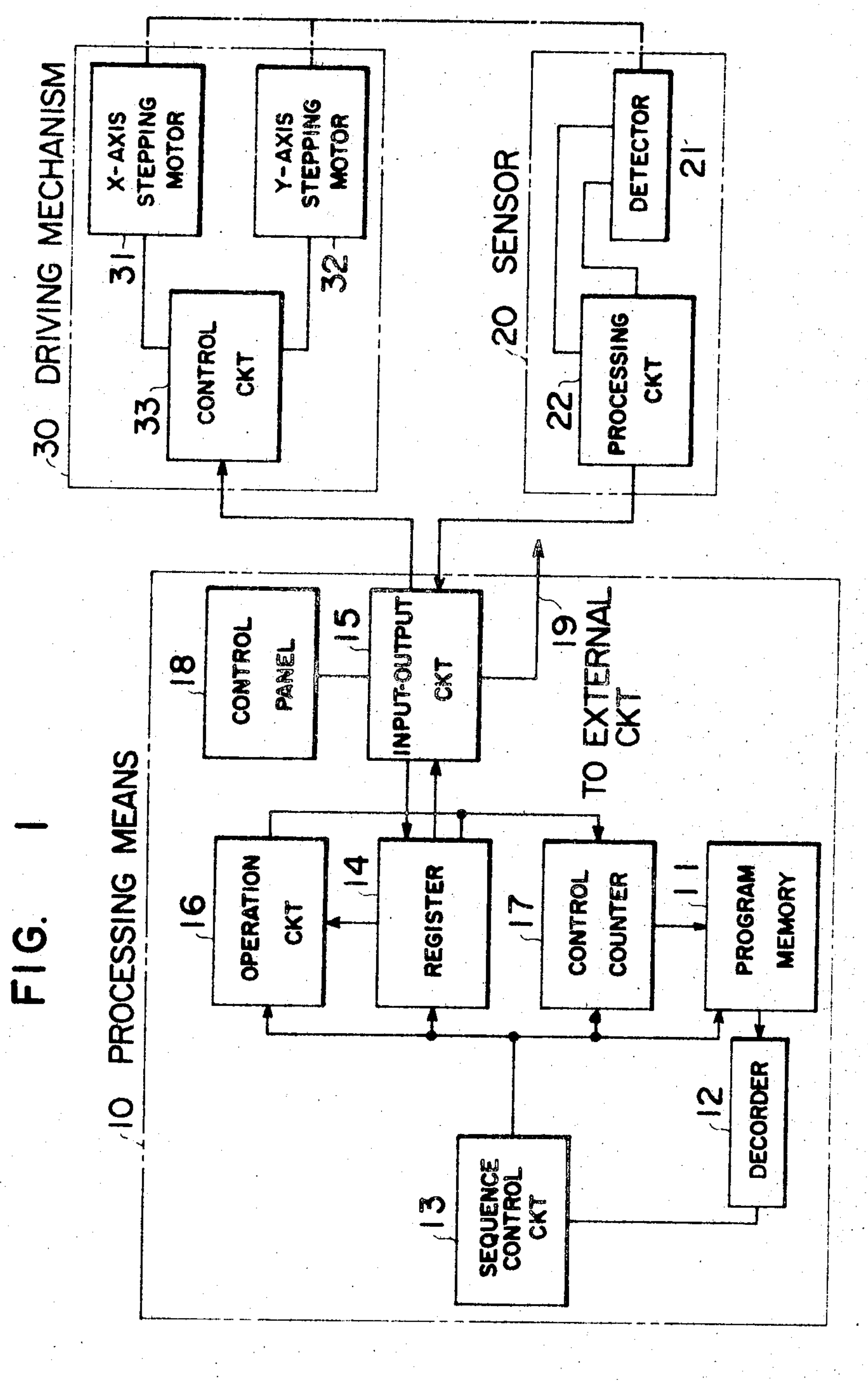
FIG. 1 shows a block diagram of the entire system utilized to carry out the novel method of automatically tracing the contour of a pattern.

With reference now to FIG. 1, there is shown a block diagram of the entire system of this invention comprising processing means 10, a sensor 20 and a driving mechanism 30. The sensor 20 operates to read out the positional information of the contour of a pattern to be traced and depicted on a sheet of drawing and send the read out information to the processing means 10. Processing means 10 suitably processes these data so as to drive the driving mechanism 30 according to electric signals generated as a result of such processing thus driving sensor 20 in a predetermined direction by a predetermined distance. Then the sensor 20 again reads out the positional information of the pattern contour at the new position. The above described operations are repeated to trace the contour of the pattern. Electric signals produced at respective tracing operations may be applied to an input circuit of an electronic computer, not shown, when desired.

Figure 2:
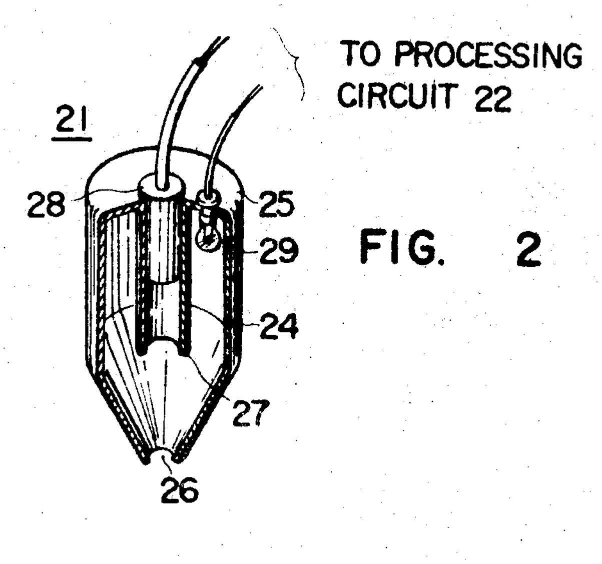
FIG. 2 is a perspective view, partly broken away, of a detector employed in the system shown in FIG. 1.

The construction of each component part is as follows: The sensor 20 comprises a detector 21 adapted to convert the tone of the pattern of the drawing into electric signals and a processing circuit 22 to suitably process the output of the detector 21. In this embodiment, the detector 21 is shown as an optical type of the construction shown in FIG. 2. As shown in FIG. 2, the detector 21 comprises an opaque cylindrical casing 24 having a top closed end 25 and a frustoconical bottom including a bottom opening 26, and a cylinder 27 concentrically disposed in the casing 24 with one end connected to the top end 25 and the lower end spaced from opening 26. A light receiving element, e.g. a photoelectric converting element 28 is disposed in cylinder 27 and a source of light 29 is disposed in a space defined between casing 24 and cylinder 27. When the sensor 20 is in its operative condition, light is projected outwardly through opening 26 from the source 29. The photoelectric converting element 28 operates to receive the light projected upon a point being scanned on the pattern and reflected therefrom and converts it into an electric signal.

The processing circuit 22 functions to shape the waveform of the electric signal from photoelectric converting element 28 to descriminate the tone of the pattern thus providing a binary output of "1" and "0" or a larger number of outputs.

Figure 3:
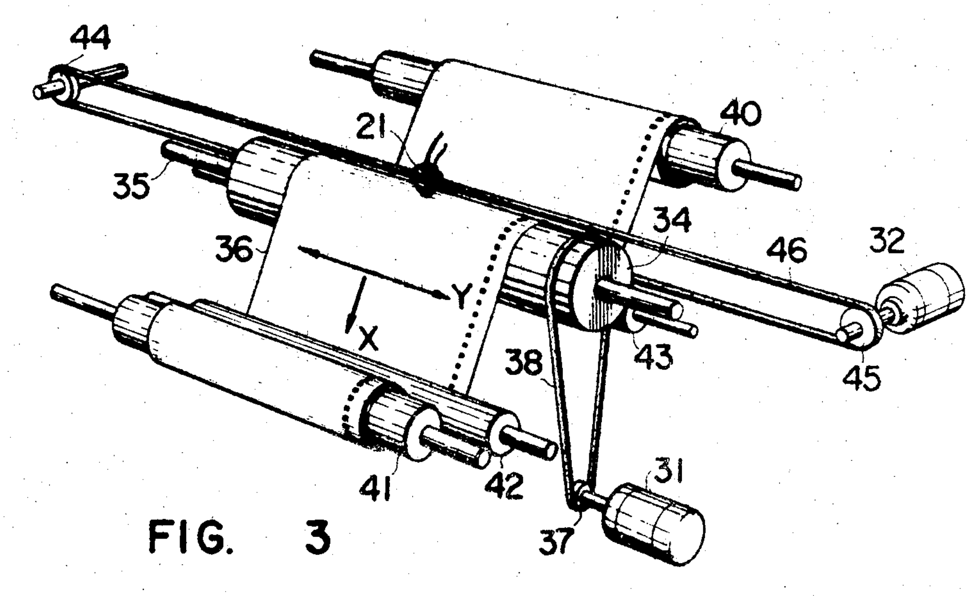
FIG. 3 is a perspective view of a driving mechanism utilized in the system shown in FIG. 1 showing the relationship between a recording paper carrying the pattern to be traced and the detector.

The driving mechanism 30 comprises two stepping motors 31 and 32 and a control circuit 33 to control stepping motors in response to a signal supplied from processing means 10, the detail of the driving mechanism being shown in FIG. 3.

As shown in FIG. 3 the driving mechanism comprises a rotary drum 34 having a shaft 35 with a recording paper 36 having therein a pattern to be traced by the detector 21, passed about the periphery of rotary drum 34. The rotary drum 34 is driven by stepping motor 31 via a belt 38 to drive the recording paper 36 in a direction indicated by an arrow (X axis). The recording paper 36 is moved between a supply reel 40 and a take up reel 41 via guide rollers 42 and 43 which function to cause the recording paper 36 to directly engage the peripheral surface of rotary drum 34. An endless belt 46 is passed around a pair of spaced apart pulleys 44 and 45 and the detector 21 is secured at a predetermined position along the length of belt 46. It is to be understood that the detector 21 is disposed so that its bottom opening 26 is directed toward the axis of rotary drum 34 and that it is moved along the surface of the drum 34 in a direction indicated by an arrow (Y axis). The pulley 45 is driven by the Y axis stepping motor 32. Responsive to one pulse from the control circuit 33 each of the stepping motors 31 and 32 steps a definite angle to move recording paper 36 and detector 21 by a definite distance. Thus, stepping motors 31 and 32 effect relative movement of about 0.1mm, for example, between recording paper 36 and detector 21 at each step. Thus, it will be seen that the driving mechanism has the same construction and function as the prior art incremental X, Y plotter.

With reference again to FIG. 1, the processing means 10 comprises a program memory 11 storing a program necessary for the scanning and tracing operations of the pattern, a decoder 12 to read the program supplied by the program memory 11, a sequence control circuit 13 to control the operating sequence of various component parts to be described later and a group of registers 14 comprised by a plurality of serially connected shift registers. The majority of these shift registers function to temporally store a signal from an input-output circuit 15 while remaining shift registers function to store constants, modes, memory addresses, return addresses and the like. These shift registers operate in response to a sequence control signal supplied from the sequence control circuit 13 described above. An operation circuit 16 is provided to perform such operations and processings as addition, subtraction, logical product and logical addition, etc., in response to a signal supplied from the group of shift registers 14. The type of the operations is selected by an operation sequence control signal supplied from the sequence control circuit 13. A control counter 17 is provided to designate the address in the memory 11 storing the program. Thus the control counter 17 contains the content of a field representing the jumping address at the time of jumping order but the contents of the return address shift register in the group of registers 14 when the order is returned from a subroutine. There is also provided control panel 18 including various switches and indicators necessary for operating the system.

When a start switch (not shown) of a control panel 18 is depressed the various components shown in FIG. 1 commence to operate so that the detector 21 of sensor 20 begins to trace the pattern according to the program stored in the memory 11. Detector 21 is driven by the driving mechanism 30 to perform a round scanning operation of a substantially square area including the pattern on the recording paper 36 which is to be traced. As used herein the term "a round scanning" means a loop-shaped scan path around the periphery of a designated elemental area. Such a round scanning can be performed by the proper control of stepping motors 31 and 32 of the driving mechanism 30 provided by the control circuit 33. The number of spots to be plotted by the round scanning operation can be selected to any value by the command from the control panel 18. In an example shown in FIG. 4, 10 spots are plotted in the direction of X axis and 10 spots are plotted in the direction of Y axis. Accordingly, a total of 40 spots are plotted at each round scanning operation.

Figure 4:
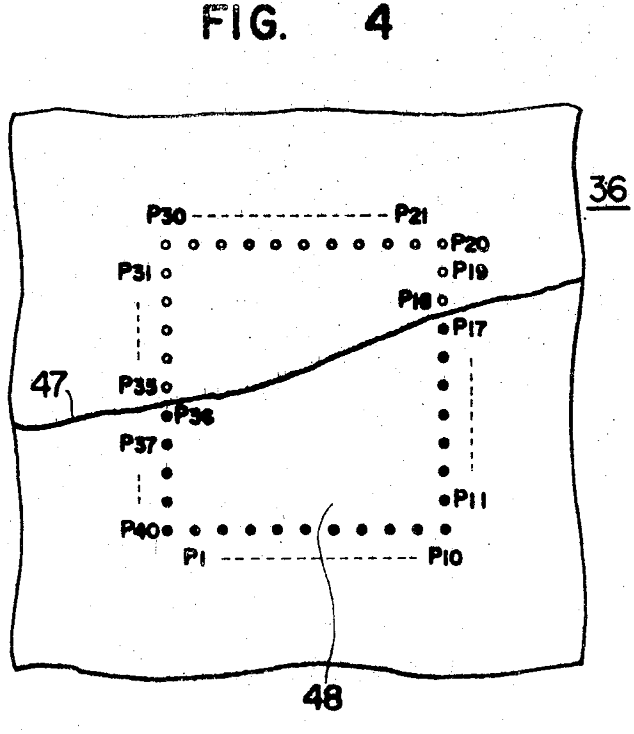
FIG. 4 is a diagram to show the relationship between a round scanning operation of the detector and the output of a sensor produced by the scanning operation where the contour of a pattern on the sheet of drawing is traced.

FIG. 4 shows a diagram to explain the operation of the detector 21 to trace a portion 48 of the area of the drawing including a pattern or curve 47 of any configuration to be traced. $P_1$, $P_2$ . . . $P_{40}$ show spots along which detector 21 is moved relative to the recording paper 36 during a round scanning operation. White and black dots at these spots represent the result obtained by processing the output of detector 21 by processing circuit 22 when the detector scans these spots. More particularly, black dots at spots $P_1$ to $P_{17}$ and $P_{36}$ to $P_{40}$ show that processing circuit 22 has judged that these spots are "black" as a result of processing the output of the detector 21. Whereas white dots at spots $P_{18}$ to $P_{35}$ show that the processing circuit 22 has judged that these spots are "white." This means that there are differences in the tone between spots $P_{17}$ and $P_{18}$ and between spots $P_{36}$ and $P_{35}$, and this information is stored. This stored information is compared with information obtained by the previous scanning operation to determine that the information most close to the previous information is the one that determines the direction of tracing.

Applicant hereby incorporates by reference FIG. 7 of application Ser. No. 41,291, filed May 28, 1970, and owned by the assignee of the present application together with the pertinent description thereof particularly page 9, lines 12–16 and page 10, line 22 through page 11, line 20.

Figure 5:
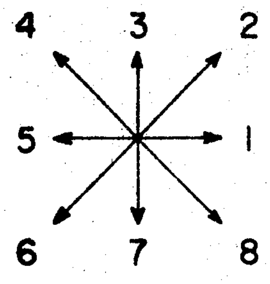
FIG. 5 shows one example of predetermined reference directions to determine the direction of the detector for tracing the contour of the pattern.

A method of determining the direction in which the detector 21 is be traced will now be described with reference to FIG. 5. As shown in FIG. 5, a plurality of, for example eight reference directions are predetermined, and these reference directions are designated by codes 1, 2 . . . 8 in the clockwise direction, for example. When it is assumed that the above described tracing direction is represented by spot $P_{17}$, then this spot is made to correspond to the reference direction "1" and a signal corresponding to direction "1" is supplied to control circuit 33 of driving mechanism 30 from registers 14 through input-output circuit 15. Accordingly detector 21 is moved to the center of the succeeding scanning operation over a predetermined distance, thus performing the tracing operation. The scanning of the contour and the movement of the scanning center are repeated alternately, thus continuously tracing the contour of a pattern.

In order to prevent variation in the tracing direction each time the scanning operation is performed the direction of the previous tracing is stored in registers 14 so that the succeeding tracing is directed toward the stored direction obtained during the previous scanning operation for contour tracing. In this example, there are 40 selected spots to be plotted and the number of these spots is stored to determine the direction of the previous tracing.

Further since the tracing distance at each step is constant by representing the tracing direction by a code 2 2 1 3 1 . . . , for example, it is possible to readily reproduce the contour of the pattern.

Although in this embodiment, a photoelectric detector has been illustrated, it will be clear that various other types of detectors may also be used including a well known magnetic detector and an electric detector depending upon the characteristics of the sheet of drawing and the property of the printing ink.

Further, to simply the construction of the detector movable on the surface of the drawing the photoelectric converting element and the source of light may be held stationary at points remote from the read-out head movable on the drawing and the head may be connected to the light source and the photoelectric converting element through light guides made of optical fiber glass.

While the invention has been shown and described in terms of a preferred embodiment thereof it will be understood that this invention is not limited to this particular embodiment and that many changes and modifications may be made without departing from the true spirit and scope of the invention as defined in the appended claims.

What is claimed is:

1. The method of automatically tracing the contour of a pattern imprinted on a surface having a background which is distinguishable from said pattern by a predetermined change in tone, said method comprising the steps of:

performing a round scanning operation along the periphery of an elemental area on said surface such that a loop-shaped path is scanned about said elemental area, said scanning including sampling successive spots along said periphery to detect a plurality of predetermined changes in tone from spot to spot;

storing digital code information in response to each detected change in tone, said code identifying the location on said periphery of said predetermined change in tone;

moving said round scanning operation over the surface containing said pattern by a predetermined distance to scan an adjacent elemental area and in a selected one of a set of predetermined directions;

storing a selected code corresponding to the direction of motion of each said movement of said scanning operation;

repeating alternately said performing said round scanning operation and said moving said scanning operation said predetermined distance; and selecting after each scanning operation the one direction of said set for moving said scanning operation which corresponds to the detected and stored code location on said periphery which is closest to the last previous stored selected code direction of motion for tracing said contour.

* * * * *